Sept. 6, 1966 A. MACHÁŇ ET AL 3,270,994

TRIPOD BASE

Filed Aug. 25, 1964

INVENTORS
Antonín Macháň, Ladislav Dubný

By Richard Low agt

United States Patent Office 3,270,994
Patented Sept. 6, 1966

3,270,994
TRIPOD BASE
Antonin Macháň and Ladislav Dubný, Prerov, Czechoslovakia, assignors to Meopta, národní podnik, Prerov, Czechoslovakia
Filed Aug. 25, 1964, Ser. No. 391,908
Claims priority, application Czechoslovakia, Aug. 27, 1963, 4,767/63
5 Claims. (Cl. 248—187)

The invention refers to a tripod base for the accommodation of a rod of a photographic camera or the like, said tripod base comprising base means or a bed, a clamp and means for effecting a clamping force. The present tripod base is especially intended for cameras of the optical bench type wherein the carrier of the photosensitive material and the lens carrier are fastened to independent holders slidable along a guiding rod.

With the tripod bases known hitherto the clamp is made as a single-arm lever-stirrup shaped according to the cross section of the guiding rod so that the clamp may partly or over its whole circumference surround the guiding rod. As a means for effecting the clamping force a screw is usually used which is mounted in the fork of the tilting clamp.

The referred to known tripod bases are disadvantageous since a single-arm lever clamp does not allow a simple and fast operation but introduces additional subsidiary operations as e.g. tilting of the clamp under the bellows of the photographic camera and screwing of the screw into the fork of the clamp.

These drawbacks are eliminated due to this invention.

Our tripod base comprises broadly base means which have an outwardly disposed surface that is adapted to partly support, for instance, a guiding rod of a photographic camera, a two-armed lever pivoted on said base means, whereby one of the lever arms has a gripping surface to cooperate with the base means surface, operating means adapted to act upon the other of the lever arms to cause the lever to swing between two end positions, an abutment member on the operating means, adapted to bear against the base means and to position the swinging lever in one of said end positions, and thus also to position said first name lever arm in a rod-gripping condition. The first named lever arm is referred to as a gripping arm while the second named lever arm is referred to as an actuating arm. The gripping arm is in a grip-releasing condition when the lever is in the other of the two end positions. Our tripod base comprises further spring means which at one end is attached to the base means and at the other end to the actuating arm to normally urged the gripping arm toward its grip-releasing position.

Figure 1:
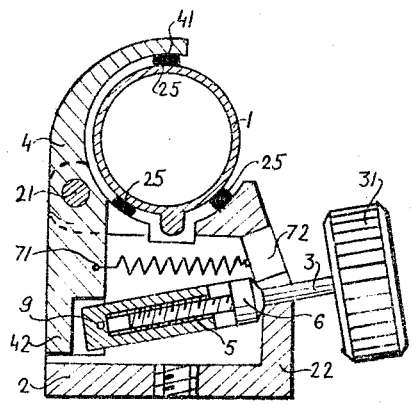
Figure 2:
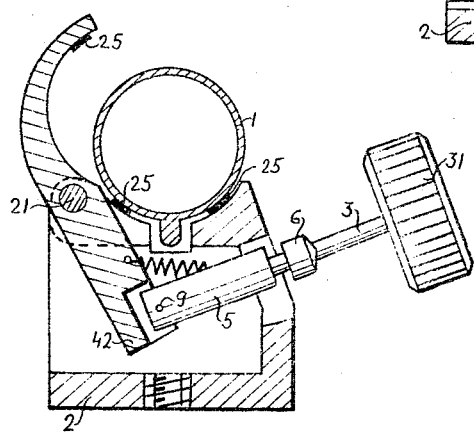
Figure 3:
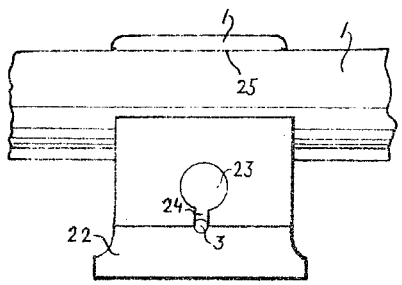

The accompanying drawing shows by way of example an embodiment of the invention, wherein FIG. 1 is a section of the tripod base with the clamped guiding rod, taken in the plane of the line 1—1 of FIG. 3;

FIG. 2 is a section similar to that of FIG. 1 with the guiding rod in loosened position; and FIG. 3 is an elevational view of the side wall of the tripod base.

According to FIG. 1 the tripod base includes base means generally designated B and a clamp 4. The base means and clamp form a boxlike structure which accommodates a guiding rod 1 of a photographic camera and is provided with pads 25. The clamp 4 is made as a double-arm swing lever that is fastened to the base means B by means of a pin 21. One arm 41 of the clamp 4 is adapted to clamp the guiding rod 1. The gripping face of the gripping arm 41 is preferably shaped according to the shape of the guiding rod 1 whose cross section in the embodiment of the invention is circular. The arm 41 is curved in such a way that it partly surround the circumference of the guiding rod 1 and is also provided with pad means 25. A nut 5 which receives a screw 3 that is provided with a knob 31 is fastened to the second arm 42 of the clamp 4 by means of pivot 9. There is further a spring 7 whose one end 71 is fastened to the clamp 4, its opposite end 72 being fastened to the base means B. As will be clear from FIG. 3 the wall 22 of the base means B is provided with a slot 24 to accommodate the screw or bolt 3, and a hole 23 to accommodate the bolt 3 together with an abutment member 6 thereon. A base plate of the base means B is designated 22.

As illustrated in FIG. 1, the base means B of the tripod base accommodates the guiding rod 1 clamped thereto by means of arm 41 of clamp 4. The position of clamp 4 shown in FIG. 1, i.e. when the guiding rod 1 is clamped in position, is secured by screw 3 which by turning of knob 31 pushes the arm 42 of clamp 4 by means of the nut 5. When the arm 41 of clamp 4 bears against the guiding rod 1 the screw 3 bears against the inner wall 22 by means of the abutment 6. Accordingly, clamping of the guiding rod 1 to the base means B of the tripod base is effected by the pressure of arm 41 of clamp 4 on guiding rod 1.

Loosening of the guiding rod 1 is effected in the following way: by screwing screw 3 into nut 5 by means of knob 31 pressure of said screw 3 on arm 42 by the nut 5 ceases and for this reason the pressure of the arm 41 of the clamp 4 on the guiding rod 1 is also released. By continued screwing of the screw 3 into the nut 5 the abutment 6 of screw 3 will be moved away from the inner face of the wall 22 of the base means B, and the screw 3 may be swung within the slot. Upon swinging the screw 3 into its upper position as shown in FIG. 2 the screw 3 is pushed into the hole 23 by means of spring 7, and the abutment 6 is pushed outwardly since the diameter of the abutment 6 is smaller than that of hole 23. In this case clamp 4 occupies a position shown in FIG. 2, i.e., when the guiding rod 1 may be removed from the base means B of the tripod base.

The described way of clamping the guiding rod of a photographic camera or the like is particularly advantageous since it provides for a simple and fast operation merely by clamping or loosening the guiding rod on the trip base.

The embodiment of the invention, as shown and described, does of course not limit the means for effecting the clamping force to a screw, but it is equally possible to operate arm 42 of the clamp 4 by means of an accentric and the like.

It is an advantage of the invention that the clamp made as a double-arm swing lever in photographic cameras using a guiding rod an easy and reliable manipulation by one hand possible, achieving a safe grip in a single operation. Known tripod bases, on the other hand, required at least two subsidiary operations including a cumbersome manipulation under the bellows of the photographic camera.

What we claimed is:
1. A tripod base for a photographic camera and the like, comprising
   (a) base means having an outwardly disposed surface adapted to partly support a guiding rod of a camera or the like,
   (b) a two-armed lever pivoted on said base means,
      (1) one of the arms of said lever having a gripping surface to cooperate with said base means surface,
   (c) operating means adapted to act upon the other of said lever arms to cause said lever to swing between two end positions,
   (d) an abutment member on said operating means, adapted to bear against said base means and to posi- tion said lever in one of said end positions, while positioning said first named or gripping arm in gripping condition, said gripping arm being in a grip-releasing condition when said lever is in the other of said end positions, and (e) spring means attached to said base means and said other or actuating lever arm to normally urge said gripping arm toward the grip-releasing position thereof.

2. In the base according to claim 1, said operating means including a nut member pivotally secured to said actuating arm, and a bolt threadedly received in said nut member and being adapted to cause, by means of said nut member, said swinging movement of the lever, said abutment member being provided on said bolt.

3. In the base according to claim 2, said base means and said lever being formed as a boxlike structure, said actuating arm constituting a swinging wall of said structure, said gripping arm forming an outwardly directed extension, said nut member being disposed substantially within said structure, said bolt having two ends, a portion at one of said bolt ends extending outwardly of said structure to render said bolt operable from the outside.

4. In the base according to claim 3, said boxlike structure including a wall opposite said actuating arm, said opposite wall being provided with opening means, said abutment member bearing against the inner face of said opposite wall when said gripping arm is in its gripping position, and being free to pass through said opening means in an outward direction when said gripping arm moves toward its grip-releasing position.

5. In the base according to claim 4, said opening means being formed by a first and second opening, said second opening being shaped so as to allow said abutment member to pass therethrough, said first opening being formed as a slot radially opening into said second opening and being of a width that permits said bolt, but not said abutment member, to pass therethrough.

References Cited by the Examiner
UNITED STATES PATENTS

| | | | |
|---|---|---|---|
| 623,606 | 4/1899 | Homan | 248—230 |
| 1,304,584 | 5/1919 | McCraith | 81—118 |
| 1,568,101 | 1/1926 | Taylor | 248—230 |
| 2,735,519 | 2/1956 | Frischman | 24—249 |

FOREIGN PATENTS 497,844  12/1950  Belgium.

CLAUDE A. LE ROY, *Primary Examiner.*

JOHN PETO, *Examiner.*

J. F. FOSS, *Assistant Examiner.*